US011670283B2

(12) United States Patent
Lu et al.

(10) Patent No.: US 11,670,283 B2
(45) Date of Patent: *Jun. 6, 2023

(54) DURATION INFORMED ATTENTION NETWORK (DURIAN) FOR AUDIO-VISUAL SYNTHESIS

(71) Applicant: TENCENT AMERICA LLC, Palo Alto, CA (US)

(72) Inventors: Heng Lu, Sammamish, WA (US); Chengzhu Yu, Bellevue, WA (US); Dong Yu, Bothell, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/396,182

(22) Filed: Aug. 6, 2021

(65) Prior Publication Data

US 2021/0375259 A1 Dec. 2, 2021

Related U.S. Application Data

(63) Continuation of application No. 16/549,068, filed on Aug. 23, 2019, now Pat. No. 11,151,979.

(51) Int. Cl.
*G10L 13/08* (2013.01)
*G10L 13/027* (2013.01)
(Continued)

(52) U.S. Cl.
CPC ............ *G10L 13/033* (2013.01); *G06T 13/40* (2013.01); *G10L 13/00* (2013.01); *G10L 13/10* (2013.01);
(Continued)

(58) Field of Classification Search
CPC ....... G10L 13/047; G10L 13/08; G10L 25/30; G10L 13/02; G10L 13/00; G10L 15/063;
(Continued)

(56) References Cited

U.S. PATENT DOCUMENTS 5,586,215 A 12/1996 Stork et al.
6,208,356 B1 3/2001 Breen et al.
(Continued)

FOREIGN PATENT DOCUMENTS

JP 2007-279776 A 10/2007

OTHER PUBLICATIONS

Dupont et al. "Audio-visual speech modeling for continuous speech recognition", 2000, IEEE transactions on multimedia. Sep. 2000; 2(3):141-51.*

(Continued)

*Primary Examiner* — Olujimi A Adesanya
(74) *Attorney, Agent, or Firm* — Sughrue Mion, PLLC

(57) ABSTRACT

A method and apparatus include receiving a text input that includes a sequence of text components. Respective temporal durations of the text components are determined using a duration model. A spectrogram frame is generated based on the duration model. An audio waveform is generated based on the spectrogram frame. Video information is generated based on the audio waveform. The audio waveform is provided as an output along with a corresponding video.

18 Claims, 6 Drawing Sheets

(51) Int. Cl.
*G10L 13/02* (2013.01)
*G10L 13/033* (2013.01)
*G10L 13/10* (2013.01)
*G10L 19/03* (2013.01)
*G06T 13/40* (2011.01)
*G10L 19/00* (2013.01)
*G10L 13/00* (2006.01)

(52) U.S. Cl.
CPC .......... *G10L 19/0018* (2013.01); *G10L 19/03* (2013.01); *G10L 2013/105* (2013.01)

(58) Field of Classification Search
CPC ... G10L 2013/105; G10L 25/18; G10L 15/16; G10L 13/04
See application file for complete search history.

(56) References Cited

U.S. PATENT DOCUMENTS

| | | | |
|---|---|---|---|
| 6,539,354 | B1 | 3/2003 | Sutton et al. |
| 6,633,839 | B2 | 10/2003 | Kushner et al. |
| 7,117,231 | B2* | 10/2006 | Fischer ................ H04N 21/235 707/999.203 |
| 7,168,953 | B1 | 1/2007 | Poggio et al. |
| 7,664,644 | B1 | 2/2010 | Tur |
| 8,340,965 | B2* | 12/2012 | Yan ........................ G10L 13/08 704/266 |
| 9,305,530 | B1 | 4/2016 | Durham et al. |
| 9,542,939 | B1* | 1/2017 | Hoffmeister ............ G10L 15/02 |
| 10,186,252 | B1 | 1/2019 | Mohammadi |
| 10,347,238 | B2 | 7/2019 | Jin et al. |
| 2008/0059185 | A1* | 3/2008 | Chung .................. G10L 15/142 704/256 |
| 2012/0053933 | A1 | 3/2012 | Tamura et al. |
| 2012/0130717 | A1 | 5/2012 | Xu et al. |
| 2013/0124206 | A1 | 5/2013 | Rezvani et al. |
| 2014/0210830 | A1 | 7/2014 | Latorre-Martinez et al. |
| 2015/0052084 | A1* | 2/2015 | Kolluru ............. G06F 16/90335 706/11 |
| 2016/0140953 | A1 | 5/2016 | Kwon |
| 2017/0148431 | A1 | 5/2017 | Catanzaro et al. |
| 2017/0301347 | A1* | 10/2017 | Fuhrman ................ G10L 15/063 |
| 2019/0180732 | A1 | 6/2019 | Ping et al. |
| 2019/0251952 | A1 | 8/2019 | Arik et al. |
| 2020/0035209 | A1* | 1/2020 | Luan ..................... G10H 1/368 |
| 2020/0051583 | A1* | 2/2020 | Wu ........................ G10L 13/047 |
| 2020/0082807 | A1 | 3/2020 | Kim et al. |

OTHER PUBLICATIONS

International Search Report in International Application No. PCT/US20/45142, dated Oct. 22, 2020.

Written Opinion in International Application No. PCT/US20/45142, dated Oct. 22, 2020.

Wu et al., "Deep neural networks employing multi-task learning and stacked bottleneck features for speech synthesis", 2015, In2015 IEEE international conference on acoustics, speech and signal processing (ICASSP) Apr. 19, 2015 (pp. 4460-4464). IEEE.

Ipsic etal, "Croatian HMM-based speech synthesis", 2006, In Journal of Computing and Information Technology. Dec. 30, 2006;14(4):307-13.

Extended European Search Report dated Apr. 13, 2022 in European Application No. 20856809.7.

Chengzhu Yu et al., "DurIAN: Duration Informed Attention Network For Multimodal Synthesis", Sep. 5, 2019, pp. 1-11 (11 pages total), Retrieved from the Internet: URL: https://arxiv.org/pdf/1909.01700.pdf.

Yi Ren et al., FastSpeech: Fast, Robust and Controllable Text to Speech, arXiv:1905.09263v4, May 29, 2019, p. 1-14 (14 pages total).

Office Action dated Sep. 20, 2022 from the Japanese Patent Office in JP Application No. 2021-560105.

* cited by examiner

DURATION INFORMED ATTENTION NETWORK (DURIAN) FOR AUDIO-VISUAL SYNTHESIS

CROSS REFERENCE TO RELATED APPLICATIONS

This application is Continuation of U.S. application Ser. No. 16/549,068, filed Aug. 23, 2019, the content of which is incorporated herein by reference in their entirety.

U.S. application Ser. No. 16/397,349, filed Apr. 29, 2019, is also incorporated herein by reference in its entirety.

BACKGROUND

Field

Embodiments described herein relate to methods and apparatuses which generate speech and video information from an input.

Description of Related Art

Recently, end-to-end speech synthesis systems, such as Tacotron, have shown impressive text-to-speech (TTS) results from the perspective of naturalness as well as the prosody of the synthesized speech. However, such systems have significant drawbacks in terms of some words in the input text being skipped or repeated while synthesizing speech. This problem is caused by its end-to-end nature where a non-controllable attention mechanism is used for speech generation.

Effects and Advantages of Certain Embodiments

Embodiments described herein relate to methods and apparatuses which model and generate both speech and video information of talking faces, and in some embodiments, simultaneously. These embodiments are based on a new model—the Duration Informed Attention Network (DurIAN), which is described herein, but also in U.S. application Ser. No. 16/397,349, which as noted above, is incorporated by its entirety into the instant disclosure.

Previously, end-to-end attention based models have shown improvements over traditional none end-to-end TTS frameworks. However, end-to-end attention based models also suffer from omitting and repeating words in the raw input text, which is a commonly seen deficiency in the end-to-end attention framework.

Embodiments of this disclosure introduce independent phone duration modeling into the end-to-end attention framework, and successfully solves a problem in traditional end-to-end attention framework. Embodiments of this disclosure model both speech and video information of talking faces simultaneously using the newly proposed Duration Informed Attention Network (DurIAN) framework. Embodiments of this disclosure show better performance over conventional audio-visual modeling methods. Embodiments of this disclosure also support modeling and synthesizing voices and faces with different styles, e.g. happy, sad, annoying, natural, etc. Embodiments of this disclosure also show better duration and system controllability over conventional frameworks.

Embodiments of this disclosure can also be applied to virtual persons, virtual faces, etc.

Embodiments of this disclosure provide better and more synchronized audio-visual modeling and synthesizing methods with the DurIAN model.

Embodiments of this disclosure support multi-style audio-visual modeling and synthesizing.

Embodiments of this disclosure provide for better controllability for audio-visual modeling and synthesizing than conventional methods.

Embodiments of this disclosure can also be applied on only audio or only visual features, or modeling them as multi-task training.

SUMMARY

According to some possible implementations, a method may comprise: receiving, by a device, a text input that includes a sequence of text components; determining, by the device and using a duration model, respective temporal durations of the text components; generating, by the device, a first set of spectra based on the sequence of text components; generating, by the device, a second set of spectra based on the first set of spectra and the respective temporal durations of the sequence of text components; generating, by the device, a spectrogram frame based on the second set of spectra; generating, by the device, an audio waveform based on the spectrogram frame; generating, by the device, video information corresponding to the audio waveform; and providing, by the device and as an output of the device, the audio waveform and a corresponding video based on the video information.

According to some possible implementations, the method may comprise training the duration model.

According to some possible implementations, in the method, the text input may be obtained by: receiving as an input, an input video including a corresponding input audio waveform; generating by the device, input video information corresponding to the input audio waveform; generating, by the device, an input spectrogram frame based on the input audio waveform; generating, by the device, a first input set of spectra based on the input spectrogram frame; generating, by the device, a second input set of spectra, based on the first input set of spectra; and determining, by the device and using the duration model the text input.

According to some possible implementations, in the method, the text components may be phonemes or characters.

According to some possible implementations, the method may further comprise: receiving by the device, information corresponding to an emotional state associated with the text input, and wherein the audio waveform and corresponding video provided as the output of the may be based on the information corresponding to the emotional state.

According to some possible implementations, in the method, in the audio waveform and the corresponding video, which may be based on the video information, may be simultaneously provided as the output.

According to some possible implementations, in the method, the training the duration model may include multi-task training.

According to some possible implementations, in the method, the output audio waveform and the output corresponding video may be applied to a virtual person.

According to some possible implementations, in the method, the second set of spectra may comprise mel-frequency cepstrum spectra.

According to some possible implementations, in the method, training the duration model may include using a set of prediction frames and training text components.

According to some possible implementations, a device may comprise: at least one memory configured to store program code; at least one processor configured to read the program code and operate as instructed by the program code, the program code including: receiving code configured to cause the at least on processor to receive a text input that includes a sequence of text components; determining code that is configured to cause the at least one processor to determine, using a duration model, respective temporal durations of the text components; generating code that is configured to cause the at least one processor to: generate first set of spectra based on the sequence of text components; generate a second set of spectra based on the first set of spectra and the respective temporal durations of the sequence of text components; generate a spectrogram frame based on the second set of spectra; generate an audio waveform based on the spectrogram frame; generate video information corresponding to the audio waveform; and providing code that is configured to cause the at least one processor to provide the audio waveform and a corresponding video as an output.

According to some possible implementations, the program code may further include training code configured to train the duration model.

According to some possible implementations, the text input which the receiving code is configured to cause the at least one processor to receive may be obtained by the program code which further includes: input receiving code, configured to cause the at least one processor to receive as an input, an input video including a corresponding input audio waveform; generating input code that is configured to cause the at least one processor to: generate input video information corresponding to the input audio waveform; generate an input spectrogram frame based on the input audio waveform; generate a first input set of spectra based on the input spectrogram frame; and generate a second input set of spectra, based on the first input set of spectra; and input determining code configured to provide the text input by using the duration model on the second input set of spectra.

According to some possible implementations, the text components may be phonemes or characters.

According to some possible implementations, the receiving code may be further configured to cause the at least on processor to receive information corresponding to an emotional state associated with the text input, and wherein the providing code is further configured to provide the audio waveform and the corresponding video as the output based on the information corresponding to the emotional state.

According to some possible implementations, the providing code may be further configured to simultaneously provide the audio waveform and the corresponding video as the output.

According to some possible implementations, the training code may be configured to train the duration model using multi-task training.

According to some possible implementations, the providing code may be further configured to provide the audio waveform and the corresponding video as the output applied to a virtual person.

According to some possible implementations, the training code may be configured to train the duration model using a set of prediction frames and training text components.

According to some possible implementations, there may be provided a non-transitory computer-readable medium storing instructions, the instructions comprising: one or more instructions that, when executed by one or more processors of a device, cause the one or more processors to: receive a text input that includes a sequence of text components; determine, using a duration model, respective temporal durations of the text components; generate a first set of spectra based on the sequence of text components; generate a second set of spectra based on the first set of spectra and the respective temporal durations of the sequence of text components; generate a spectrogram frame based on the second set of spectra; generate an audio waveform based on the spectrogram frame; generate video information corresponding to the audio waveform; and provide the audio waveform and a corresponding video as an output.

DETAILED DESCRIPTION

Figure 1:
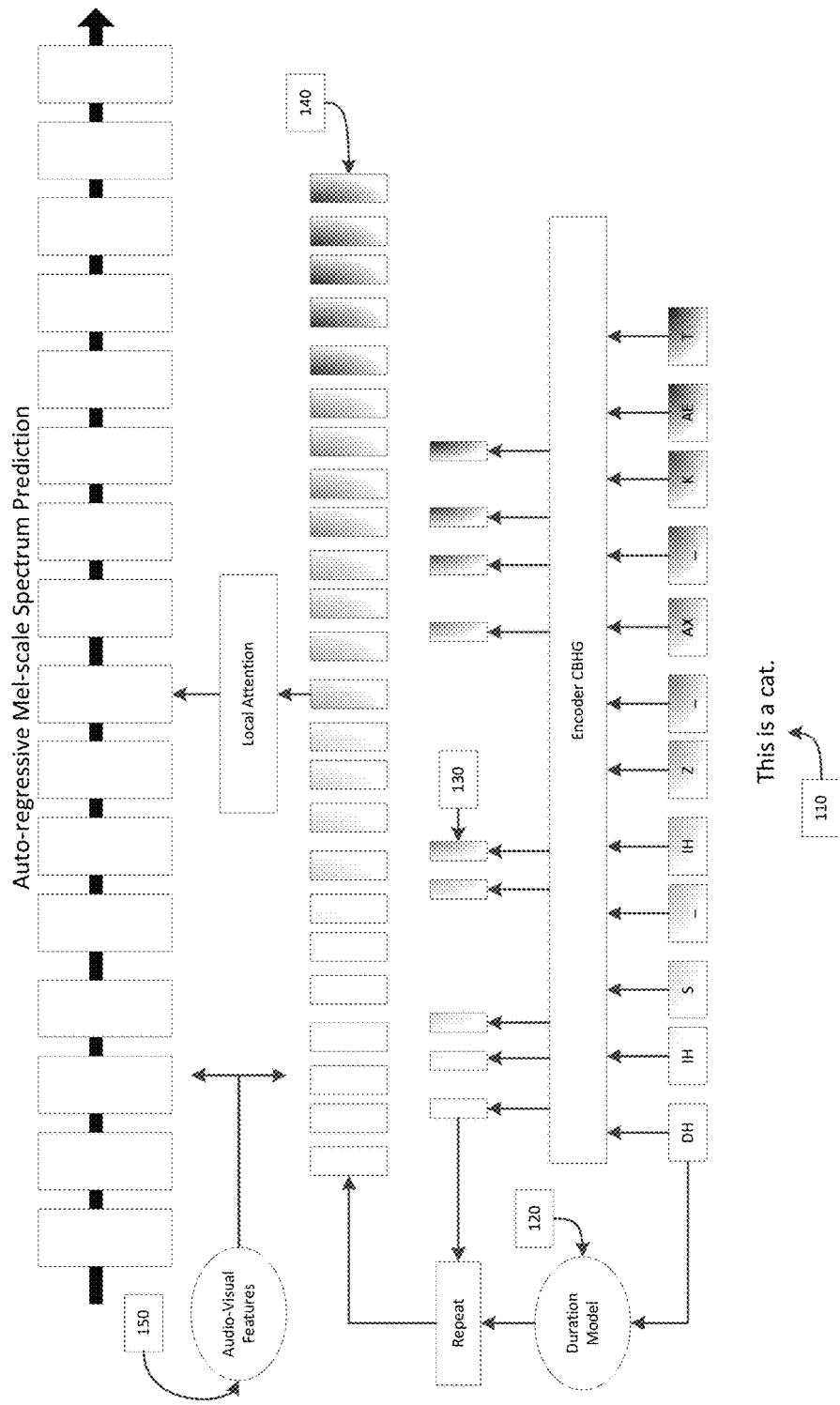
FIG. 1 is a diagram of an overview of an example implementation described herein.

TTS systems have diverse applications. However, largely-adopted commercial systems are mostly based on parametric systems which have a large gap as compared to natural human speech. Tacotron is a TTS-synthesis system that is significantly different from conventional parametric-based TTS systems, and is capable of producing highly natural speech sentences. The entire system can be trained in an end-to-end fashion, and replaces a conventional complicated linguistic feature extraction part with an encoder-convolution-bank-highway network-bidirectional-gated-recurrent unit (CBHG) module.

The duration model which has been used in conventional parametric systems is replaced with end-to-end attention mechanism where the alignment between input text (or phoneme sequences) and speech signals are learned from an attention model instead of a Hidden Markov Model (HMM)-based alignment. Another major difference associated with the Tacotron system is that it directly predicts mel/linear spectrum which could be used directly by an advanced vocoder such as Wavenet and WaveRNN for synthesizing high quality speech.

The Tacotron-based systems are capable of generating more accurate and natural-sounding speech. However, Tacotron systems include instabilities such as skipping and/or repeating input texts, which is an inherent drawback when synthesizing speech waveforms.

Some implementations herein address the foregoing input text skipping and repeating problem with Tacotron-based systems while preserving its superior synthesizing quality. Further, some implementations herein address these instability issues and achieve significantly improved naturalness in synthesized speech.

The instability of Tacotron is predominantly caused by its uncontrollable attention mechanism, and there is no guarantee that each input text can be sequentially synthesized without skipping or repeating.

Some implementations herein replace this unstable and uncontrollable attention mechanism with a duration based attention mechanism where the input text is guaranteed to be sequentially synthesized without skipping or repeating. The main reason why attention is needed in Tacotron-based systems is the missing alignment information between source text and a target spectrogram.

Typically, the length of input text is much shorter than that of a generated spectrogram. The single character/phoneme from input text might generate multiple frames of spectrogram while this information is needed for modeling input/output relationships with any neural network architecture.

The Tacotron-based systems have predominantly addressed this problem with an end-to-end mechanism, where the generation of spectrogram relied on a learned attention on source input text. However, such an attention mechanism is fundamentally unstable as its attention is highly incontrollable. Some implementations herein replace the end-to-end attention mechanism within the Tacotron system with a duration model that predicts how long a single input character and/or phoneme lasts. In other words, the alignment between an output spectrogram and input text is achieved by replicating each input character and/or phoneme for a predetermined duration. The ground truth duration of input text to learned from our systems are achieved with HMI based forced alignment. With predicted duration, each target frame in spectrogram could be matched with one character/phoneme in the input text. The entire model architecture is plotted in the figure below.

FIG. 1 is a diagram of an overview of an embodiment described herein. As shown in FIG. 1, and by reference number 110, a platform (e.g., a server) may receive a text input that includes a sequence of text components. As shown, the text input may include a phrase such as "this is a cat." The text input may include a sequence of text components shown as characters "DH," "IH," "S," "IH," "Z," "AX," "K," "AE," and "T."

As further shown in FIG. 1, and by reference number 120, the platform may determine, using a duration model, respective temporal durations of the text components. The duration model may include a model that receives an input text component and determines a temporal duration of the text component. As an example, the phrase "this is a cat" may include an overall temporal duration of one second when audibly output. The respective text components of the phrase may include different temporal durations that, collectively, form the overall temporal duration.

As an example, the word "this" may include a temporal duration of 400 milliseconds, the word "is" may include a temporal duration of "200 milliseconds," the word "a" may include temporal duration of 100 milliseconds, and the word "cat" may include a temporal duration of 300 milliseconds. The duration model may determine that respective constituent temporal durations of the text components.

As further shown in FIG. 1, and by reference number 130, the platform may generate a first set of spectra based on the sequence of text components. For example, the platform may input the text components into a model that generates output spectra based on input text components. As shown, the first set of spectra may include respective spectra of each text component (e.g., shown as "1," "2," "3," "4," "5," "6," "7," "8," and "9").

As further shown in FIG. 1, and by reference number 140, the platform may generate a second set of spectra based on the first set of spectra and the respective temporal durations of the sequence of text components. The platform may generate the second set of spectra by replicating the spectra based on the respective temporal durations of the spectra. As an example, the spectra "1" may be replicated such that the second set of spectra includes three spectra components that correspond to the spectra "1," etc. The platform may use the output of the duration model to determine the manner in which to generate the second set of spectra.

As further shown in FIG. 1, and by reference number 140, the platform may generate a spectrogram frame based on the second set of spectra. The spectrogram frame may be formed by the respective constituent spectra components of the second set of spectra. As shown in FIG. 1, the spectrogram frame may align with a prediction frame. Put another way, the spectrogram frame generated by the platform may accurately align with an intended audio output of the text input.

As shown in FIG. 1, a phone duration mode may be introduced in an end-to-end attention framework to align the input linguistic text to an output acoustic feature. As also shown in FIG. 1, both audio and visual features may be used as auto-regressive output s. Further, style and emotion types can also be added into encoded linguistic features for audio-visual style control.

The platform may, using various techniques, generate an audio waveform based on the spectrogram frame, and provide the audio waveform as an output. Likewise, the platform may also generate and output a corresponding video.

In this way, some implementations herein permit more accurate audio and video output generation associated with speech-to-text synthesis by utilizing a duration model that determines the respective temporal durations of input text components.

Figure 2:
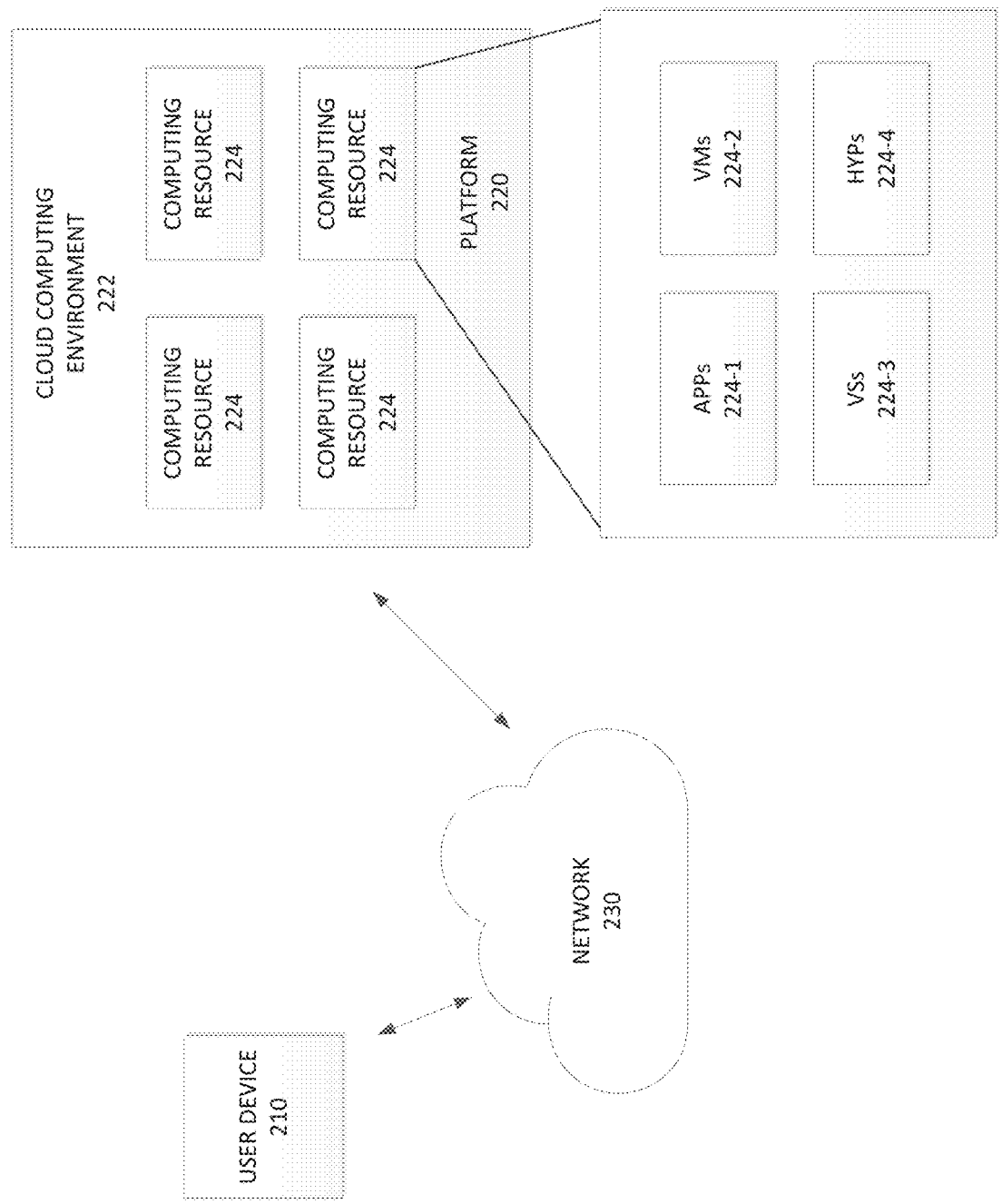
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a platform 220, and a network 230. Devices of environment 200 may interconnect via wired connections, wireless connections, or a combination of wired and wireless connections.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of generating an audio waveform using a duration informed attention network for text-to-speech synthesis, as described elsewhere herein. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 is not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210 and/or sensor device 220. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations. Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
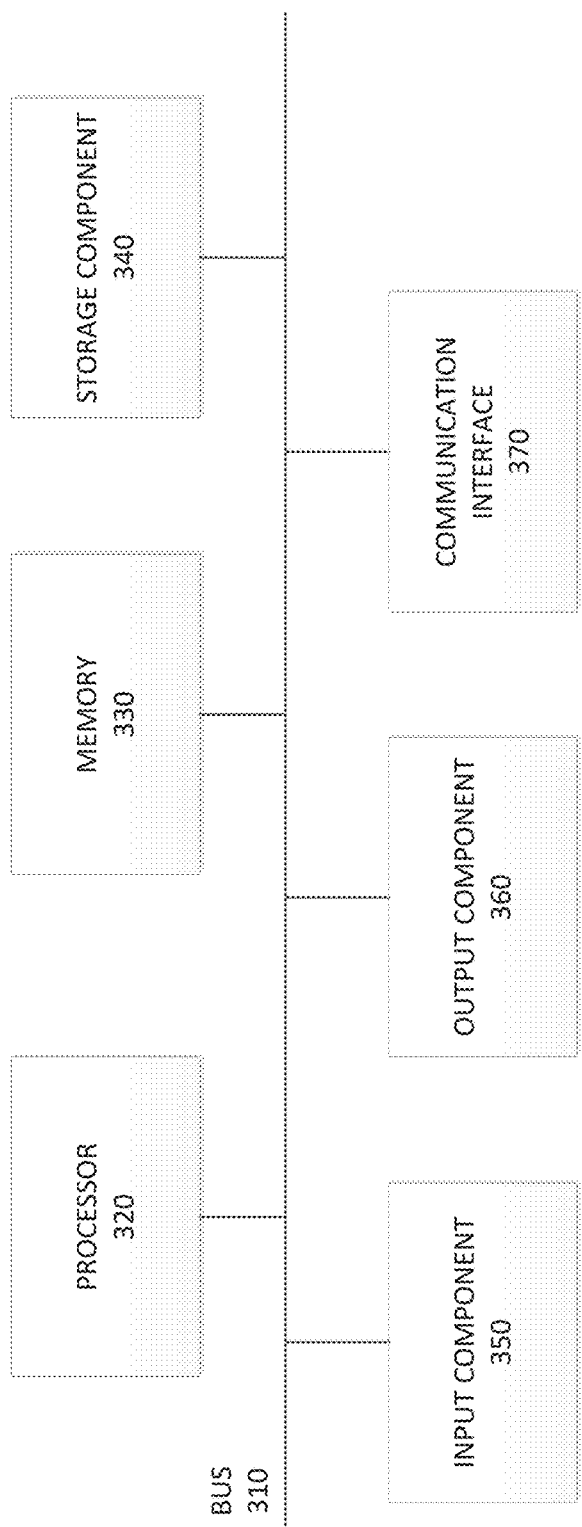
FIG. 3 is a diagram of example components of one or more devices of FIG. 2.

FIG. 3 is a diagram of example components of a device 300. Device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
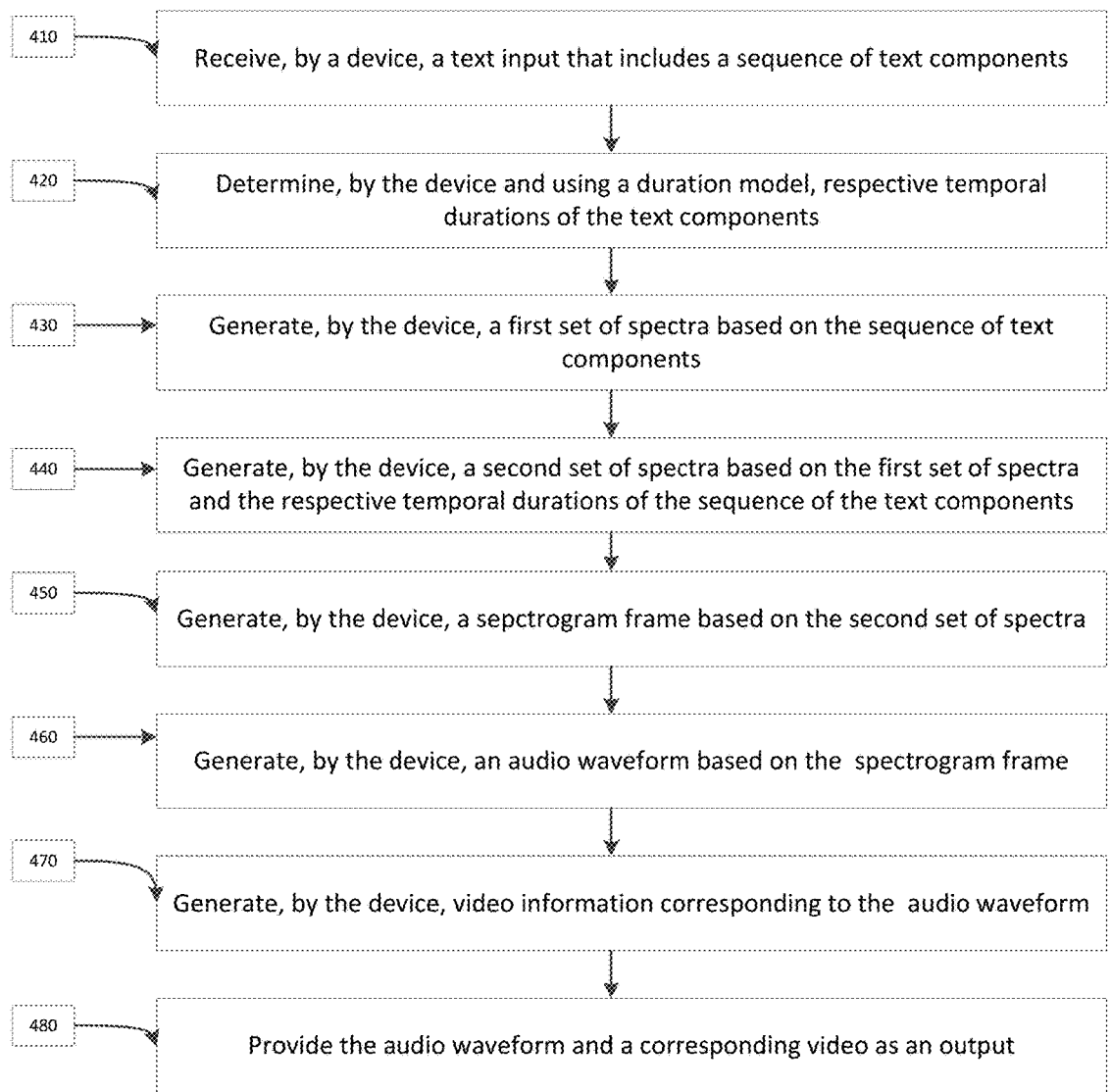
FIG. 4 is a flow chart of an example process for generating an audio waveform and corresponding video accord to embodiments.
Figure 5A:
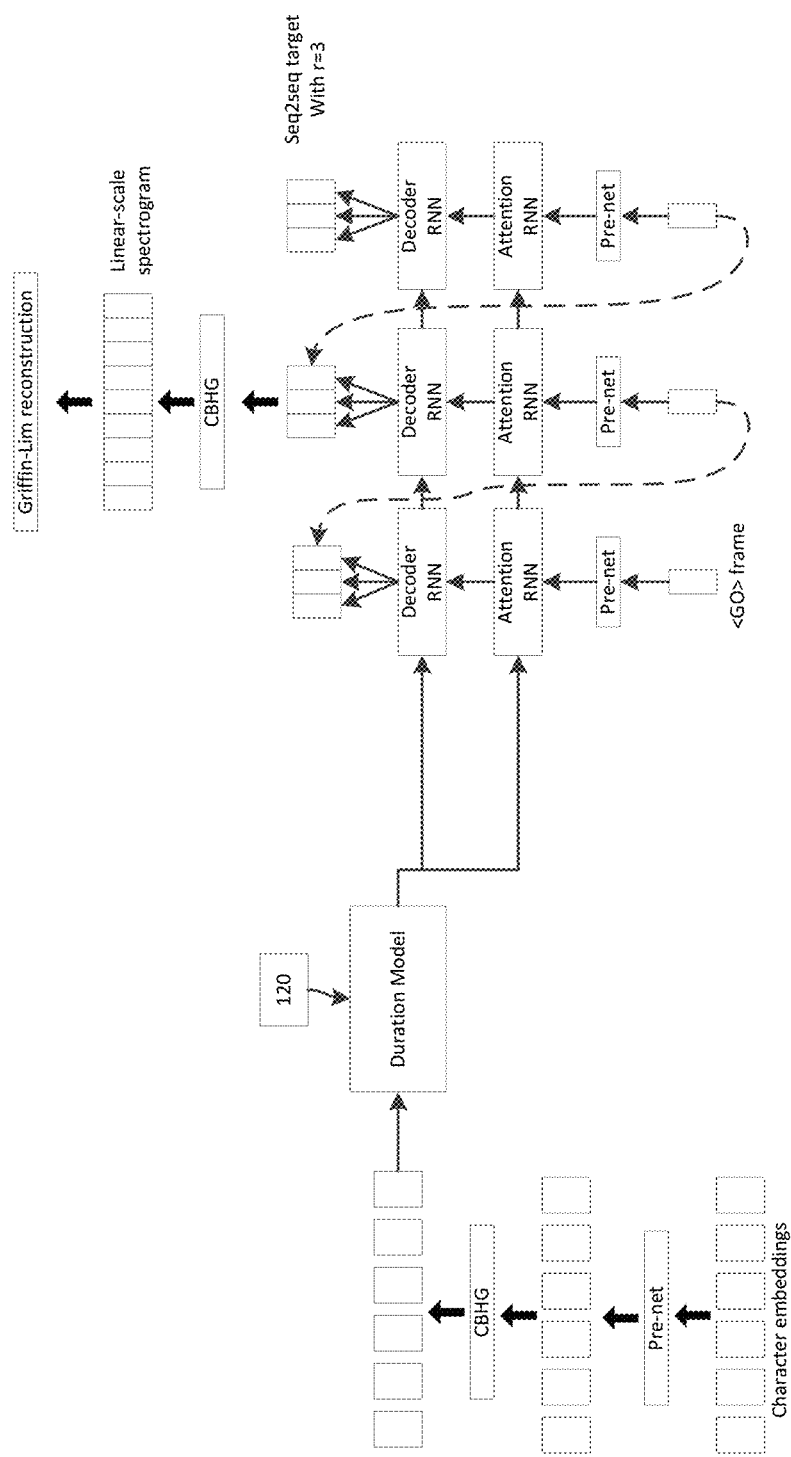
FIGS. 5 A and 5 B are diagrams including inputs and outputs of duration models according to embodiments.
Figure 5B:
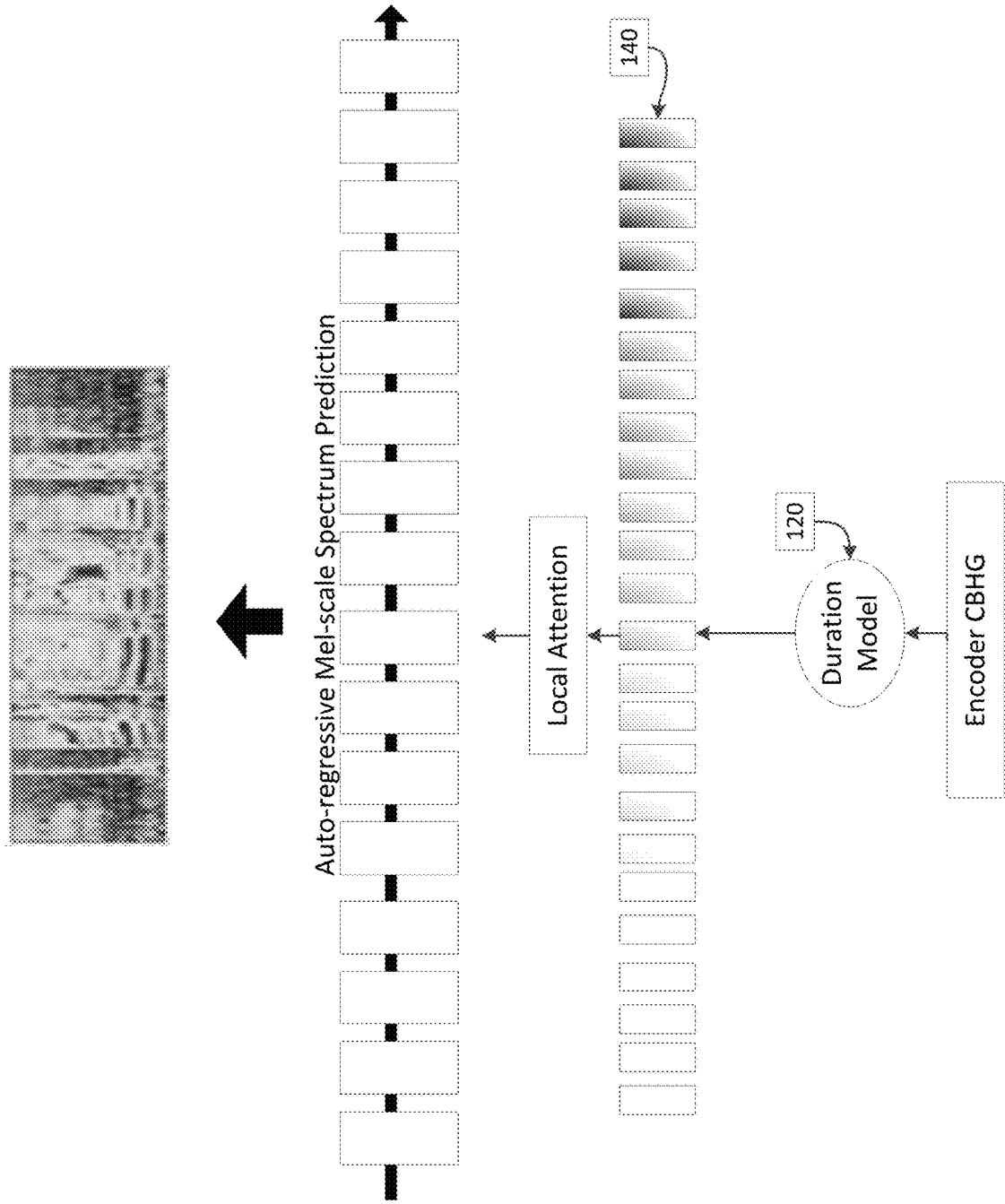

FIG. 4 is a flow chart of an example process 400 for generating an audio waveform and corresponding video using a duration informed attention network for text-to-speech synthesis. In some implementations, one or more process blocks of FIG. 4 may be performed by platform 220. In some implementations, one or more process blocks of FIG. 4 may be performed by another device or a group of devices separate from or including platform 220, such as user device 210.

As shown in FIG. 4, process may include receiving, by a device, a text input that includes a sequence of text components (block 410).

For example, platform 220 may receive a text input that is to be converted to an audio output. The text components may include characters, phonemes, n-grams, words, letters, and/or the like. The sequence of text components may form a sentence, a phrase, and/or the like.

As further shown in FIG. 4, the process may include determining, by the device and using a duration model, respective temporal durations of the text components (block 420).

The duration model may include a model that receives an input text component, and determines a temporal duration of the input text component. Platform 220 may train the duration model. For example, platform 220 may use machine learning techniques to analyze data (e.g., training data, such as historical data, etc.) and create the duration model. The machine learning techniques may include, for example, supervised and/or unsupervised techniques, such as artificial networks, Bayesian statistics, learning automata, Hidden Markov Modeling, linear classifiers, quadratic classifiers, decision trees, association rule learning, or the like.

The platform 220 may train the duration model by aligning a spectrogram frame of a known duration and a sequence of text components. For example, platform 220 may determine a ground truth duration of an input text sequence of text components using HMM-based forced alignment. The platform 220 may train the duration model by utilizing prediction or target spectrogram frames of known durations and known input text sequences including text components.

The platform 220 may input a text component into the duration model, and determine information that identifies or is associated with a respective temporal duration of the text component based on an output of the model. The information that identifies or is associated with the respective temporal duration may be used to generate the second set of spectra, as described below.

As further shown in FIG. 4, the process may include generating a first set of spectra based on the sequence of text components (block 430).

For example, the platform 220 may generate output spectra that correspond to the text components of the input sequence of text components. The platform 220 may utilize a CBHG module to generate the output spectra. The CBHG module may include a bank of 1-D convolutional filters, a set of highway networks, a bidirectional gated recurrent unit (GRU), a recurrent neural network (RNN), and/or other components.

The output spectra may be mel-frequency cepstrum (MFC) spectra in some implementations. The output spectra may include any type of spectra that is used to generate a spectrogram frame.

As further shown in FIG. 4, the process may include generating a second set of spectra based on the first set of spectra and the respective temporal durations of the sequence of text components (block 440).

For example, the platform 220 may generate the second set of spectra using the first set of spectra and the information that identifies or is associated with the respective temporal durations of the text components.

As an example, the platform 220 may replicate various spectra of the first set of spectra based on the respective temporal durations of the underlying text components that correspond to the spectra. In some cases, the platform 220 may replicate a spectra based on a replication factor, a temporal factor, and/or the like. In other words, the output of the duration model may be used to determine a factor by which to replicate a particular spectra, generate additional spectra, and/or the like.

As further shown in FIG. 4, the process may include generating a spectrogram frame based on the second set of spectra (block 450).

For example, the platform 220 may generate a spectrogram frame based on the second set of spectra. Collectively, the second set of spectra forms a spectrogram frame. As mentioned elsewhere herein, the spectrogram frame that is generated using the duration model may more accurately resemble a target or prediction frame. In this way, some implementations herein improve accuracy of TTS synthesis, improve naturalness of generated speech, improve prosody of generated speech, and/or the like.

As further shown in FIG. 4, the process may include generating an audio waveform based on the spectrogram frame (460).

For example, the platform 220 may generate an audio waveform based on the spectrogram frame, and provide the audio waveform for output. As examples, the platform 220 may provide the audio waveform to an output component (e.g., a speaker, etc.), may provide the audio waveform to another device (e.g., user device 210), may transmit the audio waveform to a server or another terminal, and/or the like.

As further shown in FIG. 4, the process may include generating by the device, video information corresponding to the audio waveform.

Finally, as shown in FIG. 4, the process may include providing the audio waveform and corresponding video as an output.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving as an input, an input video including a corresponding input audio waveform;
    generating, by a device, input video information corresponding to the input audio waveform;
    determining, by the device and using a duration model on the input audio waveform, a text input that includes a sequence of text components;
    determining, by the device and using the duration model, respective temporal durations of the text components;
    generating, by the device, a first set of spectra based on the sequence of text components;
    generating, by the device, a second set of spectra based on the first set of spectra and the respective temporal durations of the sequence of text components;
    generating, by the device, a spectrogram frame based on the second set of spectra;
    generating, by the device, an audio waveform based on the spectrogram frame;
    generating, by the device, video information corresponding to the audio waveform; and
    providing, by the device and as an output of the device, the audio waveform and a corresponding video based on the video information,
    wherein the text input is obtained by
        generating, by the device, an input spectrogram frame based on the input audio waveform;
        generating, by the device, a first input set of spectra based on the input spectrogram frame; and
        generating, by the device, a second input set of spectra, based on the first input set of spectra.

2. The method of claim 1, further comprising:
    training the duration model.

3. The method of claim 1, wherein the text components are phonemes or characters.

4. The method of claim 1 further comprising:
    receiving by the device, information corresponding to an emotional state associated with the text input, and
    wherein the audio waveform and the corresponding video provided as the output of the are based on the information corresponding to the emotional state.

5. The method of claim 1, wherein the providing, by the device and as the output of the device, the audio waveform and the corresponding video based on the video information, is performed simultaneously.

6. The method claim 2, wherein the training the duration model includes multi-task training.

7. The method of claim 1, wherein the output audio waveform and the output corresponding video are applied to a virtual person.

8. The method of claim 1, wherein the second set of spectra comprise mel-frequency cepstrum spectra.

9. The method of claim 2, wherein training the duration model includes using a set of prediction frames and training text components.

10. A device, comprising:
    at least one memory configured to store program code;
    at least one processor configured to read the program code and operate as instructed by the program code, the program code including:

input receiving code, configured to cause the at least one processor to receive as an input, an input video including a corresponding input audio waveform;

generating input code that is configured to cause the at least one processor to:
  generate input video information corresponding to the input audio waveform;

determining code configured to cause the at least on processor to determine, using a duration model on the input audio waveform, a text input that includes a sequence of text components;

determining code that is configured to cause the at least one processor to determine, using the duration model, respective temporal durations of the text components;

generating code that is configured to cause the at least one processor to:
  generate first set of spectra based on the sequence of text components;
  generate a second set of spectra based on the first set of spectra and the respective temporal durations of the sequence of text components;
  generate a spectrogram frame based on the second set of spectra;
  generate an audio waveform based on the spectrogram frame;
  generate video information corresponding to the audio waveform; and providing code that is configured to cause the at least one processor to provide the audio waveform and a corresponding video as an output, wherein the text input which the receiving code is configured to cause the at least one processor to receive is obtained by the program code which further includes:
  generating input code that is configured to cause the at least one processor to:
    generate an input spectrogram frame based on the input audio waveform;
    generate a first input set of spectra based on the input spectrogram frame; and
    generate a second input set of spectra, based on the first input set of spectra.

11. The device of claim 10, wherein the program code further includes training code configured to train the duration model.

12. The device of claim 10, wherein the text components are phonemes or characters.

13. The device of claim 10, wherein the receiving code is further configured to cause the at least on processor to receive information corresponding to an emotional state associated with the text input, and wherein the providing code is further configured to provide the audio waveform and the corresponding video as the output based on the information corresponding to the emotional state.

14. The device of claim 10, wherein the providing code is further configured to simultaneously provide the audio waveform and the corresponding video as the output.

15. The device of claim 11, wherein the training code is configured to train the duration model using multi-task training.

16. The device of claim 10, wherein the providing code is further configured to provide the audio waveform and the corresponding video as the output applied to a virtual person.

17. The device of claim 11, wherein the training code is configured to train the duration model using a set of prediction frames and training text components.

18. A non-transitory computer-readable medium storing instructions, the instructions comprising: one or more instructions that, when executed by one or more processors of a device, cause the one or more processors to:
  receive as an input, an input video including a corresponding input audio waveform;
  generate, by the device, input video information corresponding to the input audio waveform;
  determine, by the device and using a duration model on the input audio waveform, a text input that includes a sequence of text components;
  determine, using a duration model, respective temporal durations of the text components;
  generate a first set of spectra based on the sequence of text components;
  generate a second set of spectra based on the first set of spectra and the respective temporal durations of the sequence of text components;
  generate a spectrogram frame based on the second set of spectra;
  generate an audio waveform based on the spectrogram frame;
  generate video information corresponding to the audio waveform; and
  provide the audio waveform and a corresponding video as an output, wherein to obtain the text input, the instructions further cause the one or more processors to:
  generate, by the device, an input spectrogram frame based on the input audio waveform;
  generate, by the device, a first input set of spectra based on the input spectrogram frame; and
  generate, by the device, a second input set of spectra, based on the first input set of spectra.

* * * * *